tion of the pressure transducer. A compressible bellows is therefore provided which expands and compresses responsive to the changing volumes of the damping oil to substantially eliminate internal pressure changes within the transducer on account of thermal expansion and contraction of the damping oil.

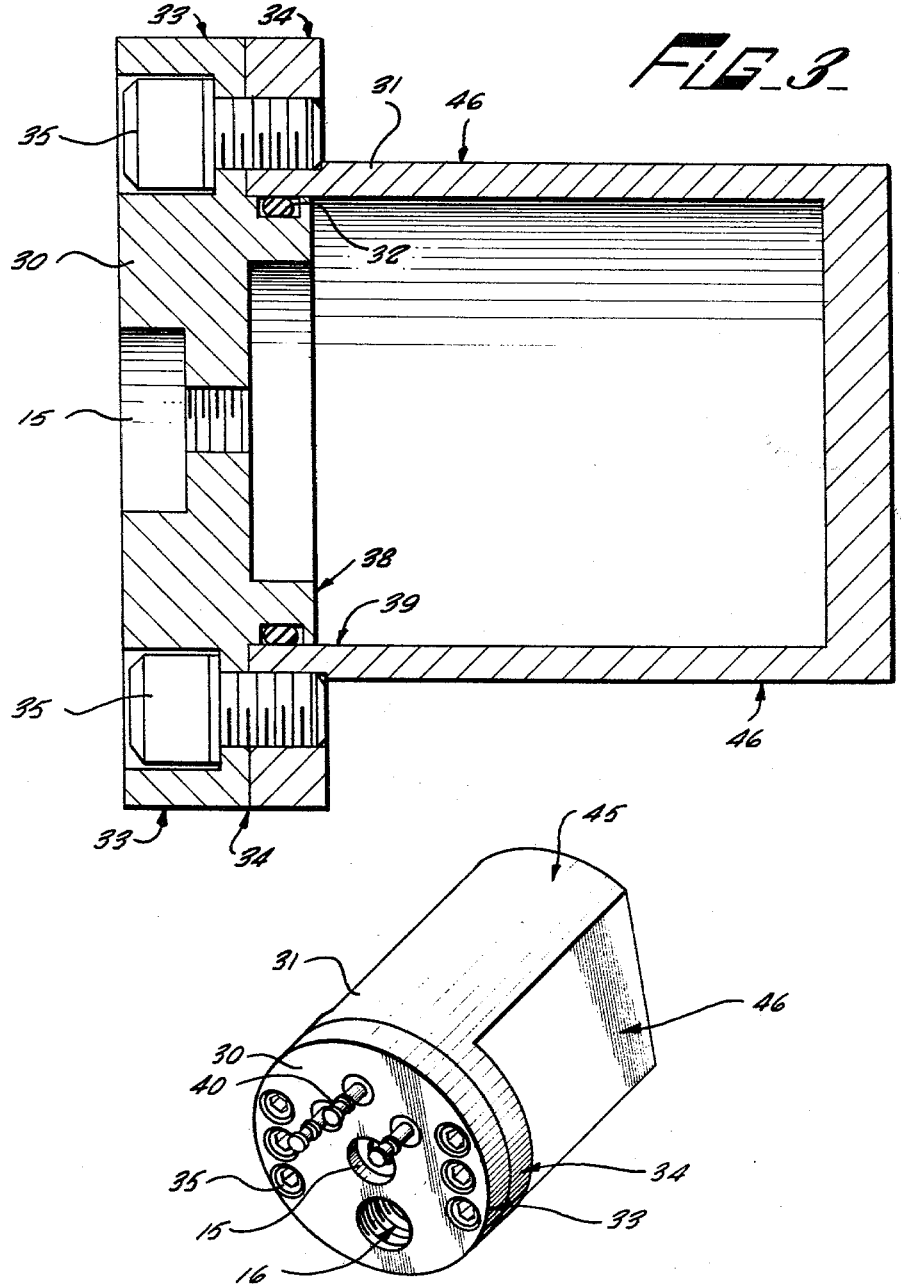

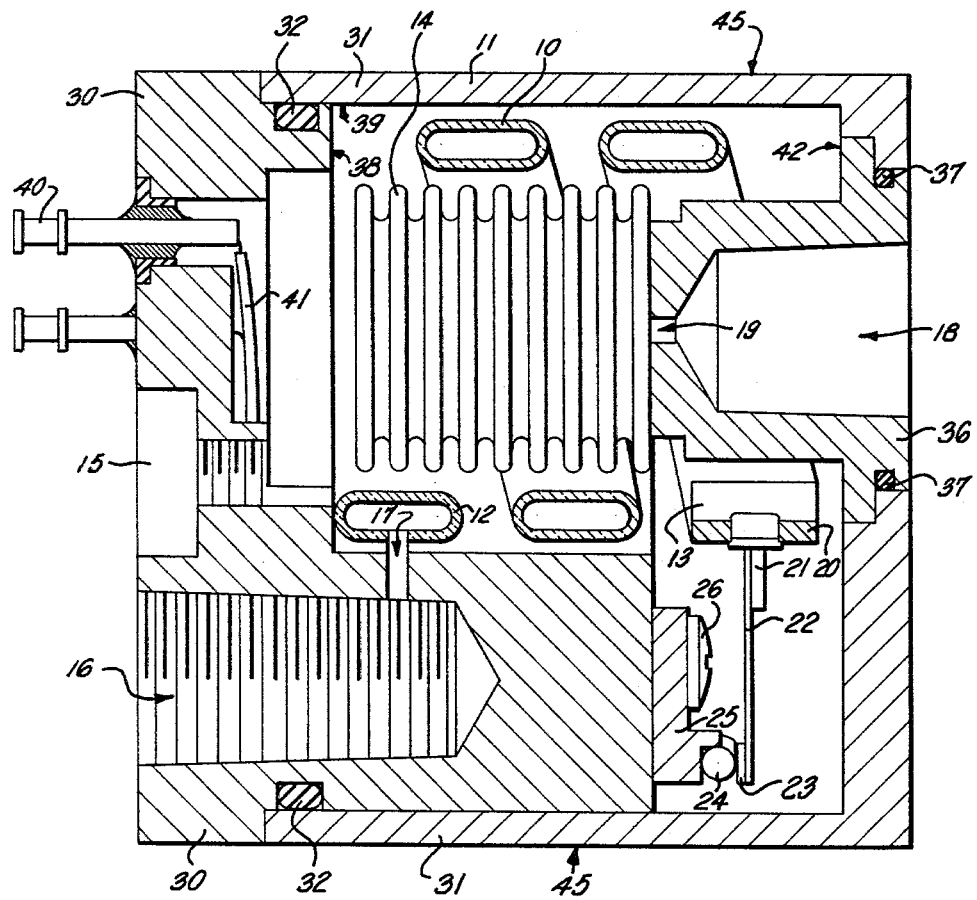

United States Patent Office 3,181,368
Patented May 4, 1965

3,181,368
FLUID PRESSURE TRANSDUCER
Ralph S. Cass, Azusa, and Richard W. Goetz, Temple City, Calif., assignors to Edcliff Instruments, Inc., Monrovia, Calif., a corporation of California
Filed Apr. 5, 1962, Ser. No. 185,371
15 Claims. (Cl. 73—412)

This invention relates to fluid pressure transducers, and particularly to fluid pressure transducers for measuring substantially high pressures in installations where miniature size of the measuring device is required.

It has been known that a helical pressure sensing element such as a Bourdon tube, will tend to "unwind" as its internal pressure increases over the pressure on its exterior surface, and will also "wind up" as the exterior pressure increases over the internal pressure. Thus, through proper calibration and interpretation of the resulting movements of a Bourdon tube, a measurement of the pressures causing the movement may be obtained.

As a pressure transducer is ordinarily filled with a damping oil, and also subjected to a wide range of temperatures, allowance must be made for the varying volumes of the damping oil resulting from its thermal expansion and contraction. Otherwise, an internal pressure factor within the instrument would be caused by the damping oil, which could interfere with the operation of the pressure transducer. A compressible bellows is therefore provided which expands and compresses responsive to the changing volumes of the damping oil to substantially eliminate internal pressure changes within the transducer on account of thermal expansion and contraction of the damping oil.

It has been a disadvantage of previous pressure transducers employing the helical Bourdon tube and the compressible bellows that both elements occupy a substantial volume and increase the size of the unit beyond desirable limits.

A fluid pressure transducer may be employed to measure the pressure of a fluid relative to another fluid at a predetermined pressure. This is referred to as a gage unit, and the predetermined pressure is ordinarily atmospheric pressure. In other installations, however, it may be desired to measure a fluid pressure relative to a standard second pressure, ordinarily a vacuum, wherein results are not affected by atmospheric pressure or temperature. This is referred to as an obsolute unit. Further, it is often desired to measure the differential between two fluids under pressure, such as in determining the variation in line pressure on opposite sides of an orifice. Such an installation may be referred to as a differential unit. It has been a disadvantage of former fluid pressure transducers that no single instrument was adaptable for use selectively as a gage, absolute, or differential unit, different forms of construction being required especially for differential unit installations.

Heretofore the range of pressures to which a fluid pressure transducer could be subjected was limited due to the lack of a housing able to withstand very high pressures. Since the high pressures being measured are applied to the interior of the transducer, substantial flexure of the housing results. Former housings tended to shear bolts holding the housing together and to spread apart the portions of the housing at points where parts were joined together, breaking the seal and causing leakage or breakdown of the instrument.

The present invention resolves these disadvantages, providing a fluid pressure transducer of miniature size, adaptable for use as a gage, absolute, or differential unit, and able to withstand substantially higher internal pressures than former pressure transducers.

This invention provides a helical pressure sensing element disposed within a housing, having one end attached to the housing and one end free to move within the housing responsive to pressure differentials between the interior and the exterior of the element. The housing is filled with a damping oil and a compressible bellows is provided within the housing. The bellows is adapted to expand and compress responsive to changing volumes of the damping oil resulting from thermal expansion and contraction of the oil. Great space saving is achieved by placing the compressible bellows within the opening formed by the curvature of the helical pressure sensing element, so that the helical element is disposed around the bellows. The end of the helical pressure sensing element which is attached to the housing is adapted to be closed when it is desired to use the apparatus as an absolute unit, and to be open at all other times. First and second pressure inlet means are provided and are adapted to be connected with sources of fluid under pressure, the word "fluid" being defined to include both liquids and gases. The first inlet means is arranged to communicate with the interior of the helical pressure sensing element through the end of the element attached to the housing, at times when the end is opened. The second inlet means communicates with the interior of the bellows. Measuring means are provided to measure the movement of the free end of the helical pressure sensing element.

It is another feature of the present invention that the housing is so arranged that bolts holding sections together are held in pure tension, rather than in shear position, and sealing means are provided to permit flexure of the housing without leakage around the seal, resulting in a greatly increased range of pressures which may be applied.

This invention may be better understood with reference to the accompanying drawings, in which:

FIG. 1 is a perspective view of a fluid pressure transducer in accordance with the present invention;

FIG. 2 is a cross-section view along lines 2—2 of FIG. 1; and

FIG. 3 is a cross-section of the housing alone of a fluid pressure transducer in accordance with the present invention, along lines 3—3 of FIG. 1.

Referring now to the drawings, in which like reference numerals denote like elements in all drawings, in the presently preferred embodiment of the invention a helical Bourdon tube 10 is disposed within a housing indicated generally at 11. The Bourdon tube 10 has a first end 12 attached to the housing 11 and a second end 13 free to move within the housing 11. The second end 13 is closed at all times. The housing 11 is filled with a damping oil (not shown), such as a silicon damping oil, by removal of oil-fill screw 15. A compressible bellows 14 is disposed within the open area formed by the helical curvature of the Bourdon tube 10, so that the Bourdon tube 10 winds around the bellows 14.

The housing 11 is shaped to define a first pressure inlet means, being a threaded opening or fitting in the preferred embodiment, indicated generally at 16, including a passage indicated generally at 17 communicating through the first end 12 of the Bourdon tube 10 with the interior of the Bourdon tube 10. If it is desired to use the apparatus as an absolute unit, the Bourdon tube 10 may be evacuated until a high vacuum prevails therein, and the first end 12 may then be sealed and closed at the point of communication with the passage 17 to the first pressure inlet means 16.

The housing 11 is also shaped to define a second pressure inlet means, being a threaded opening or fitting indicated generally at 18 in the preferred embodiment, including a passage indicated generally at 19 communicating with the interior of the bellows 14.

Both the first pressure inlet means 16 and the second pressure inlet means 18 in the preferred embodiment are arranged to extend within the housing 11 for greater compactness of size, but it will be understood that they may be formed to extend outwardly therefrom if desired. The pressure inlet means 16 and 18 may be adapted to fit a variety of forms of tubing (not shown) which may be used to carry a fluid under pressure to the pressure inlet means.

It will thus be seen that for use as a gage unit, a first fluid under pressure to be measured may be supplied through the first pressure inlet means 16 to the interior of the Bourdon tube 10, while a second fluid at predetermined pressure is supplied through the second pressure inlet means 18. This will ordinarily be accomplished by simply leaving second pressure inlet means 18 open to air under atmospheric pressure. Since the compressible bellows 14 expands and contracts responsive to thermal expansion and contraction of the damping oil to substantially eliminate internal pressure therefrom, it will be seen that the pressure inside the housing 11 being applied to the exterior of the Bourbon tube 10 will be substantially that pressure being supplied through the second pressure inlet means 18. Thus, when the pressure of the fluid being supplied to the interior of the Bourdon tube 10 through the first pressure inlet means 16 exceeds that pressure supplied through the second pressure inlet means 18, the Bourdon tube 10 will tend to unwind, and the free second end 13 of the tube 10 will be deflected from its original position.

For use as an absolute unit the Bourdon tube 10 is evacuated, the first end 12 closed, and a source of fluid under pressure to be measured is fitted to the second pressure inlet means 18 to supply the fluid under pressure to the interior of the bellows 14. The bellows 14 will tend to expand, but will be substantially unable to do so because the housing 11 is filled with damping oil, which is substantially non-compressible. Thus, the pressure within the bellows 14 will be transmitted through the damping oil to the interior of the housing 11 and will be applied to the exterior of the Bourdon tube 10, causing the tube 10 to wind up in response thereto. The second end 13 of the tube 10 will be deflected from its original position proportionately to the amount of pressure supplied through second pressure inlet means 18.

For use as a differential unit, the first end 12 of the Bourdon tube 10 is opened, a first source of fluid under pressure to be measured is supplied through the first pressure inlet means 16 to the interior of the Bourdon tube 10, and a second source of fluid under pressure to be compared with the first source is supplied through the second pressure inlet means 18 to the interior of the bellows 14. It is then apparent that when the pressure of the first source exceeds that of the second, the Bourdon tube 10 will unwind, deflecting its second end 13 in one direction proportionately to the amount by which the pressure of the first source exceeds that of the second, and if the pressure of the second source exceeds the first, the second end 13 of the Bourdon tube 10 will be deflected in like manner in the opposite direction, as the Bourdon tube winds up.

Any suitable means may be provided to measure the extent and direction of deflection of the second end 13 of the Bourdon tube 10. In the preferred embodiment, a block 20 is firmly attached to the second end 13, and carries an insulator terminal 21. An elongated brush element 22 is attached at one end to the insulator terminal 21 so as to be substantially perpendicular to the path of movement of the block 20, and carries at its opposite end contact means 23. A suitable electrical lead (not shown), such as a continuity spring, which applies substantially no force, is attached to the brush element 22 and is connected to a suitable electrical lead 41. An elongated resistance element 24 is positioned to be slidingly engaged by the contact means 23 of the brush element 22, and is connected to suitable electrical leads 41. The lead wires 41 connect with terminals 40 mounted on the housing 11. The resistance element 24 is mounted on a plate 25 which is attached to the housing 11 by a plurality of bolts 26. The plate 25 defines slots (not shown) through which the bolts 26 pass, permitting adjustment of the position of the resistance element to shorten or lengthen the effective radius of the brush element 22. The measuring means as disclosed have the great advantage that a minimum number of parts are employed, and there are no linkage connections between elements.

The housing 11 is comprised of two principal elements: a sealing element or cap 30 and an enclosing element or case 31. The enclosing element 31 has a closed end and a plurality of sides defining an open end. In the preferred form, four sides are provided, two sides 45 being in the shape of portions of a cylinder having the same diameter as the sealing element 30, and two sides 46 being straight. The sealing element 30 is adapted to close the open end of the enclosing element 31.

The enclosing element 31 may include a separate portion 36 defining the second pressure inlet means 18 and channel 19, held in place by an annular flange indicated at 42 in separate portion 36 and permanently sealed by silver solder ring 37.

The sealing element 30 is so shaped that a portion thereof, indicated generally at 38, extends within the interior of the enclosing element 31 adjacent to the portions of the sides 45 and 46 of the enclosing element 31 which define the open end thereof. The inwardly extending portion 38 of the sealing element 30 slidingly engages the inner surfaces, indicated generally at 39, of the sides 45 and 46 of the enclosing element 31 at all points thereof surrounding the open end. A resilient sealing element, such as O-ring 32, is carried by the inwardly extending portions 38 to sealingly engage the inner surfaces 39 of the sides 45 and 46 of the enclosing element 31 at a point within the interior of the enclosing element 31, so that the inwardly extending portion 38 of the sealing element 30 and the O-ring 32 may, at times of flexure, slide along the inner surfaces 39 of the sides 45 and 46 of the enclosing element 31 while retaining their sealing engagement therewith.

In the preferred form, two sealing element flanges, indicated generally at 33, carried by the sealing element 30, extend outwardly beyond the two sides 46 of the enclosing element 31, substantially perpendicular thereto, and adjacent to the open end of the enclosing element 31. Two enclosing element flanges, indicated generally at 34, carried by the two sides 46 of the enclosing element 31 adjacent to the open end thereof, extend outwardly beyond the outer surfaces of the adjacent sides 46 and substantially perpendicular thereto. The enclosing element flanges 34 are adapted to engage the sealing element flanges 33, and are secured thereto by suitable attachment means, such as a plurality of bolts 35. It will be apparent that the enclosing element 31 may have more or less than 4 sides, and there may be more than two pairs of flanges 33 and 34.

Such a flange construction, cooperating with the inwardly extending portion 38 of the sealing element 30, prevents bowing of the sides 45 and 46 of the housing 11 and shearing of the bolts 35, as the bolts 35 are held in pure tension and not in shear position. It has been found that a fluid pressure transducer made in accordance with the present invention will give satisfactory performance with pressures as high as 7500 p.s.i. each applied to the first and second pressure inlet means 16 and 18.

There has thus been disclosed a highly versatile fluid pressure transducer adapted for high pressure usage, and having extremely compact size.

We claim:
1. A fluid pressure transducer, comprising:
   (a) a housing,
   (b) hollow helical pressure sensing means disposed within the housing having a first end attached to the housing and a second end free to move within the housing,
   (c) the first end of the helical pressure sensing means defining an opening communicating with the interior thereof and adapted to be selectively opened and closed,
   (d) the second end of the helical pressure sensing means being closed and adapted to be deflected in response to a pressure differential between a pressure applied to the interior of the helical pressure sensing means and a pressure applied to the exterior of the helical pressure sensing means,
   (e) a compressible bellows disposed within the housing and adapted to expand and contract in response to a pressure differential between a pressure applied to the interior of the bellows and a pressure applied to the exterior of the bellows,
   (f) the helical pressure sensing means being disposed around at least a portion of the bellows,
   (g) damping oil filling the housing,
   (h) first pressure inlet means adapted to communicate with the opening defined by the first end of the helical pressure sensing means,
   (i) second pressure inlet means adapted to communicate with the interior of the compressible bellows, and
   (j) measuring means for measuring the deflection of the second end of the helical pressure sensing means.

2. A fluid pressure transducer according to claim 1 wherein the helical pressure sensing means comprises a helical Bourdon tube.

3. A fluid pressure transducer according to claim 1, wherein the measuring means comprises:
   (a) a block attached to the second end of the Bourdon tube,
   (b) an insulation terminal mounted on the block,
   (c) an elongated brush arm attached to the insulation terminal at one end,
   (d) contact means secured to the other end of the brush arm, and
   (e) an elongated resistance element secured to the housing and arranged to be slidingly engaged by the contact means on the brush arm.

4. A pressure transducer according to claim 1, wherein the housing comprises:
   (a) a sealing element, and
   (b) an enclosing element having a plurality of sides and a closed end, the sides defining an open end,
   (c) the sealing element being adapted to close and seal the open end of the enclosing element,
   (d) a portion of the sealing element extending within the interior of the enclosing element and adapted to slidingly engage the inner surfaces of the sides of the enclosing element in an area adjacent to all points at which the said sides define the open end of the enclosing element,
   (e) resilient sealing means carried by the portion of the sealing element extending within the enclosing element, disposed adjacent to the inner surfaces of the sides of the enclosing element, and adapted to sealingly engage the inner surfaces of the sides of the enclosing element,
   (f) a plurality of sealing element flanges carried by the sealing element adjacent to the sides of the enclosing element and extending outwardly beyond the outer surfaces of the adjacent sides of the enclosing element, substantially perpendicular thereto,
   (g) a plurality of enclosing element flanges carried by sides of the enclosing element adjacent to the open end of the enclosing element and extending outwardly beyond the outer surfaces of the sides of the enclosing element, substantially perpendicular thereto,
   (h) the enclosing element flanges being adapted to engage the sealing element flanges, and
   (i) attaching means for attaching the sealing element flanges to the enclosing element flanges and disposed between the flanges so that the attaching means are stressed in tension when the pressure interiorly of the housing exceeds the pressure exteriorly of the housing,
   (j) the housing defining the first and second pressure inlet means.

5. A fluid pressure transducer according to claim 1 wherein the first and second pressure inlet means comprise fittings defined by the housing and adapted to be connected to sources of fluids under pressure.

6. A fluid pressure transducer according to claim 5 wherein the fittings are disposed internally within the housing in such manner that they do not protrude from the outer surface of the housing.

7. A fluid pressure transducer comprising:
   (a) a housing,
   (b) a helical Bourdon tube disposed within the housing having a first end attached to the housing and a second end free to move within the housing,
   (c) the helical Bourdon tube having a vacuum therein and having the first and second ends thereof closed,
   (d) the second end of the helical Bourdon tube being adapted to be deflected in response to pressures applied to the exterior of the evacuated helical Bourdon tube,
   (e) a compressible bellows disposed within the housing and adapted to expand and contract in response to a pressure differential between a pressure applied to the interior of the bellows and a pressure applied to the exterior of the bellows,
   (f) the helical Bourdon tube being disposed around the bellows,
   (g) damping oil filling the housing,
   (h) pressure inlet means communicating with the interior of the compressible bellows, and
   (i) measuring means for measuring the deflection of the second end of the helical pressure sensing means.

8. A fluid pressure transducer according to claim 7, wherein the measuring means comprises:
   (a) a block attached to the second end of the Bourdon tube,
   (b) an insulation terminal mounted on the block,
   (c) an elongated brush arm attached to the insulation terminal at one end,
   (d) contact means secured to the other end of the brush arm, and
   (e) an elongated resistance element arranged to be slidingly engaged by the contact means on the brush arm.

9. A pressure transducer according to claim 7, wherein the housing comprises:
   (a) a sealing element, and
   (b) an enclosing element having a plurality of sides and a closed end, the sides defining an open end, (c) the sealing element being adapted to close and seal the open end of the enclosing element, (d) the sealing element being shaped to define a portion thereof extending within the interior of the enclosing element and adapted to slidingly engage the inner surfaces of the sides of the enclosing element in an area adjacent to all points at which the said sides define the open end of the enclosing element, (e) resilient sealing means carried by the portion of the sealing element extending within the enclosing element, disposed adjacent to the inner surfaces of the sides of the enclosing element, and adapted to sealingly engage the inner surfaces of the sides of the enclosing element, (f) a plurality of sealing element flanges carried by the sealing element adjacent to the sides of the enclosing element and extending outwardly beyond the outer surfaces of the adjacent sides of the enclosing element substantially perpendicular thereto, (g) a plurality of enclosing element flanges carried by sides of the enclosing element adjacent to the open end of the enclosing element and extending outwardly beyond the outer surfaces of the sides of the enclosing element substantially perpendicular thereto, (h) the enclosing element flanges being adapted to engage the sealing element flanges, and (i) attaching means for attaching the sealing element flanges to the enclosing element flanges and disposed between the flanges so that the attaching means are stressed in tension when the pressure interiorly of the housing exceeds the pressure exteriorly of the housing, (j) the housing defining the pressure inlet means.

10. A fluid pressure transducer according to claim 7 wherein the pressure inlet means comprises a fitting defined by the housing and adapted to be connected to a source of fluid under pressure.

11. A fluid pressure transducer comprising:
(a) a housing,
(b) a helical Bourdon tube disposed within the housing having a first end attached to the housing and a second end free to move within the housing,
(c) the first end of the helical Bourdon tube defining an opening communicating with the interior thereof,
(d) the second end of the helical Bourdon tube being closed and adapted to be deflected in response to a pressure differential between a pressure applied to the interior of the helical Bourdon tube and a pressure applied to the exterior of the helical Bourdon tube,
(e) a compressible bellows disposed within the housing and adapted to expand and contract in response to a pressure differential between a pressure applied to the interior of the bellows and a pressure applied to the exterior of the bellows,
(f) the helical Bourdon tube being wound around the bellows,
(g) damping oil filling the housing,
(h) first pressure inlet means adapted to communicate with the opening defined by the first end of the helical Bourdon tube,
(i) second pressure inlet means adapted to communicate with the interior of the compressible bellows, and
(j) measuring means for measuring the deflection of the second end of the helical Bourdon tube.

12. A fluid pressure transducer according to claim 11 wherein:
(a) the first pressure inlet means comprises a fitting defined by the housing and adapted to be connected to a source of fluid under pressure, and
(b) the second pressure inlet means comprises an elongated channel defined by the housing communicating with the interior of the bellows at one end and the atmosphere at the other end.

13. A fluid pressure transducer according to claim 11 wherein the measuring means comprises:
(a) a block attached to the second end of the Bourdon tube,
(b) an insulation terminal mounted on the block,
(c) an elongated brush arm attached to the insulation terminal at one end and provided with contact means at its opposite end, and
(d) an elongated resistance element arranged to be slidingly engaged by the contact means on the brush arm.

14. A pressure transducer according to claim 11, wherein the housing comprises:
(a) a sealing element, and
(b) an enclosing element having a plurality of sides and a closed end, the sides defining an open end,
(c) the sealing element being adapted to close and seal the open end of the enclosing element,
(d) the sealing element being shaped to define a portion thereof extending within the interior of the enclosing element and adapted to slidingly engage the inner surfaces of the sides of the enclosing element in an area adjacent to all points at which the said sides define the open end of the enclosing element,
(e) resilient sealing means carried by the portion of the sealing element extending within the enclosing element, disposed adjacent to the inner surfaces of the sides of the enclosing element, and adapted to sealingly engage the inner surfaces of the sides of the enclosing element,
(f) a plurality of sealing element flanges carried by the sealing element adjacent to the sides of the enclosing element and extending outwardly beyond the outer surfaces of the adjacent sides of the enclosing element substantially perpendicular thereto,
(g) a plurality of enclosing element flanges carried by sides of the enclosing element adjacent to the open end of the enclosing element and extending outwardly beyond the outer surfaces of the sides of the enclosing element substantially perpendicular thereto,
(h) the enclosing element flanges being adapted to engage the sealing element flanges, and
(i) attaching means for attaching the sealing element flanges to the enclosing element flanges and disposed between the flanges so that the attaching means are stressed in tension when the pressure interiorly of the housing exceeds the pressure exteriorly of the housing,
(j) the housing defining the first and second pressure inlet means.

15. A fluid pressure transducer, comprising
(a) a housing,
(b) hollow helical pressure sensing means disposed within the housing having a first end attached to the housing and a second end free to move within the housing,
(c) the first end of the helical pressure sensing means defining an opening communicating with the interior thereof and adapted to be selectively opened and closed,
(d) the second end of the helical pressure sensing means being closed and adapted to be deflected relative to the housing in response to a pressure differential between a pressure applied to the interior of the helical pressure sensing means and a pressure applied to the exterior of the helical pressure sensing means,
(e) first pressure inlet means defined by the housing and adapted to communicate with the opening defined by the first end of the helical pressure sensing means,
(f) second pressure inlet means defined by the housing,
(g) an elongated compressible bellows disposed within the housing and aligned substantially coaxially of the pressure sensing means and adapted to expand and contract in response to a pressure differential between a pressure applied to the interior of the bellows and a pressure applied to the exterior of the bellows, (h) the helical pressure sensing means being disposed around at least a portion of the bellows in spaced apart relation thereto, (i) the bellows being sealed to the housing peripherally of the second pressure inlet means so that the second pressure inlet means communicates to the interior of the bellows, (j) damping oil filling the housing, and (k) electrical means mounted between the second end of the helical pressure sensing means and cooperating to provide an electrical signal which is indicative of the deflection of the second end of the helical pressure means relative to the housing.

References Cited by the Examiner
UNITED STATES PATENTS

| | | | |
|---|---|---|---|
| 2,760,040 | 8/56 | Statham | 83—398 |
| 2,773,388 | 12/56 | Prosser | 73—431 |
| 2,803,138 | 8/57 | Strobl | 73—431 |
| 2,882,503 | 4/59 | Huff et al. | 336—30 |
| 3,020,504 | 2/62 | Marks | 73—411 X |

RICHARD C. QUEISSER, *Primary Examiner.*

JOSEPH P. STRIZAK, *Examiner.*